(12) United States Patent
Lee et al.

(10) Patent No.: US 6,663,800 B1
(45) Date of Patent: Dec. 16, 2003

(54) LIGHT GUIDE FABRICATING APPARATUS AND METHOD OF MANUFACTURING THE SAME

(75) Inventors: Hong Su Lee, Kumi-shi (KR); Jae Ho Hwang, Kumi-shi (KR); Wook Sung Kim, Ahnyang-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 141 days.

(21) Appl. No.: 09/717,109

(22) Filed: Nov. 22, 2000

(30) Foreign Application Priority Data

Nov. 26, 1999 (KR) ........................... P1999-53185

(51) Int. Cl.⁷ ............................... B29D 11/00
(52) U.S. Cl. ............... 264/1.24; 205/70; 249/135; 264/2.5; 425/808
(58) Field of Search ............... 264/1.24, 1.1, 264/2.5; 425/808, 810; 249/134, 135; 205/70

(56) References Cited

U.S. PATENT DOCUMENTS 4,472,124 A * 9/1984 Kashihara et al. ......... 264/107
6,132,652 A * 10/2000 Higuchi et al. ............ 264/2.5

FOREIGN PATENT DOCUMENTS

JP 4-99297 * 3/1992
JP 2000-94480 * 4/2000

* cited by examiner

Primary Examiner—Mathieu D. Vargot
(74) Attorney, Agent, or Firm—Birch, Stewart, Kolasch & Birch, LLP

(57) ABSTRACT

An apparatus for manufacturing a light guide in a liquid crystal display and a manufacturing method thereof with a simplified mold structure. In the apparatus, an core material portion is fixed to a light guide molding stamper to constitute a molding device along with the stamper. A fixing member fixes the stamper to the core material portion. The molding device constitutes a mold for molding the light guide, along with a stationary core and a movable core. Accordingly, the stamper and the molding core are integrally formed and sealed, so that a mold structure can be simplified and stable manufacturing of the light guide can be provided.

19 Claims, 7 Drawing Sheets

LIGHT GUIDE FABRICATING APPARATUS AND METHOD OF MANUFACTURING THE SAME

BACKGROUND OF THE INVENTION

1. Field of the Invention

This invention relates to a technique of fabricating a light guide used for a liquid crystal display, and more particularly to a light guide fabricating apparatus and a manufacturing method thereof having a simplified mold structure.

2. Description of the Related Art

Generally, a liquid crystal display (LCD) controls light transmissivity of liquid crystal cells arranged in a matrix pattern with the aid of a video signal applied thereto to display a picture corresponding to the video signal. To this end, the LCD includes a liquid crystal display panel having liquid crystal cells arranged in an active matrix which control an amount of light transmitted from the lower portion thereof; a backlight unit for emitting light from the lower portion of the liquid crystal display panel; red, green and blue color filters corresponding to each liquid crystal cell at the lower portion of the liquid crystal display panel; and a black matrix layer for defining pixels. The backlight unit functions to evenly emit white light from the rear side of the liquid crystal display panel, and consists of a light source, a light guide, a reflector and a diffuser, etc. for uniformly transmitting light emitted from the light source into the panel.

Figure 1:
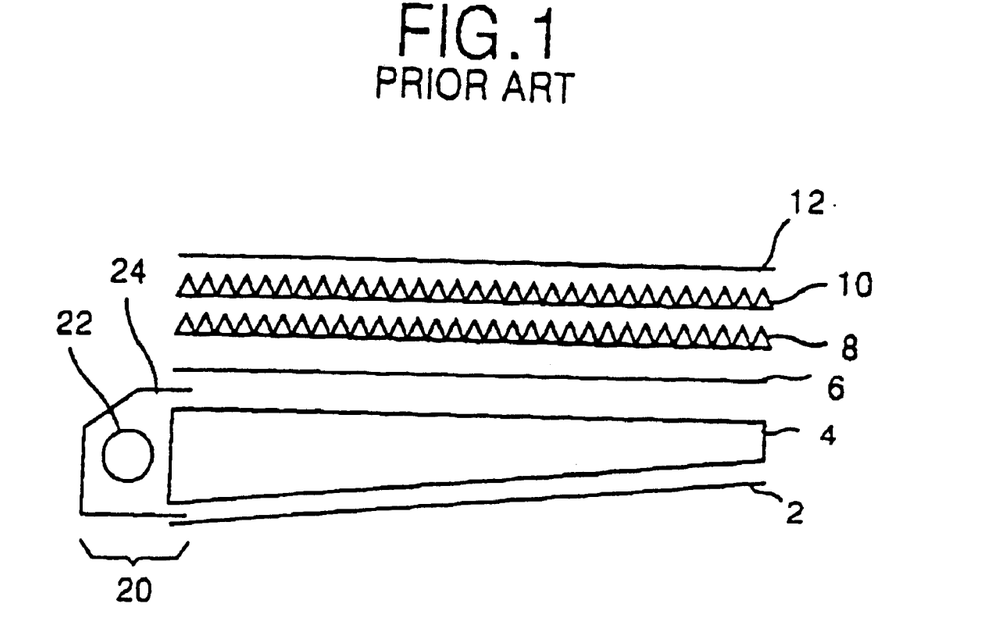
FIG. 1 is a section view showing a structure of a general backlight unit provided at the lower portion of a liquid crystal display panel.
Figure 2:
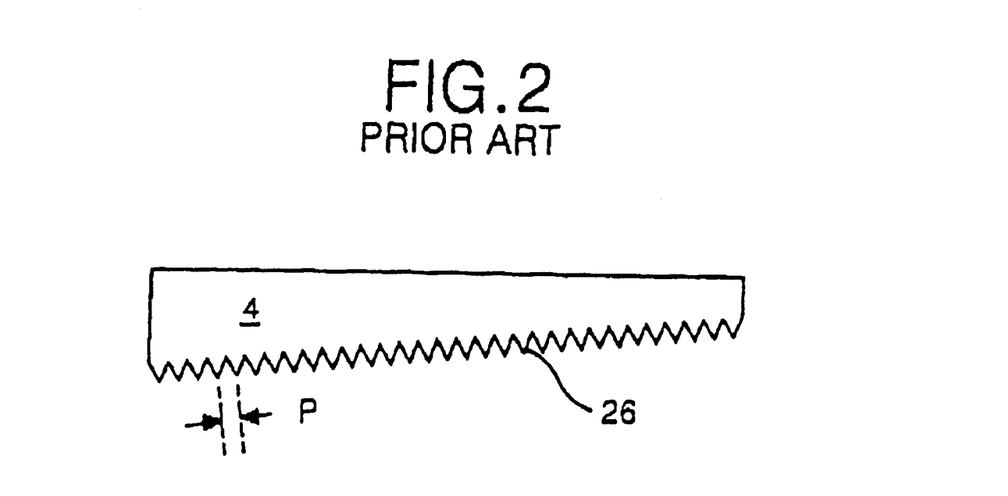
FIG. 2 is a section view showing a detailed structure of the prism light guide in FIG. 1.

FIG. 1 shows a sectional structure of a conventional backlight unit provided at the lower portion of a liquid crystal display panel. Referring to FIG. 1, the backlight unit includes a backlight lamp 22 for generating white light, a prism light guide 4 for guiding light passing through a light input 20 from the backlight lamp 22, a lamp housing 24 for mounting the backlight lamp 22 and reflecting light into the light guide 4, a reflector 2 for reflecting light from the lower portion of the prism light guide 4 toward the upper portion thereof where the liquid crystal display panel is positioned, first and second diffusing films 6 and 12, and first and second prism films 8 and 10 for controlling diffusion and transmission direction of the light passing through the prism light guide 4. The light guide 4 is formed in a prism shape with an inclined lower surface as shown in FIG. 2 and allows light inputted from the backlight lamp 22 to smoothly progress toward the upper portion thereof. Light transmission, via the lower surface of the prism light guide 4, toward the lower portion thereof is reflected upward by the reflector 2 provided at the lower portion of the light guide 4. Light passing through the prism light guide 4 is uniformly diffused by means of the first diffusing film 6. Light passing through the first diffusing film 6 is controlled to make its transmission direction perpendicular to the liquid crystal display panel at the first and second prism films 8 and 10. Light passing through the first and second prism films 8 and 10 is incident on the liquid crystal display panel by way of the second diffusing film 12 again.

For instance, the lower surface of the prism light guide 4 is inclined and provided with minute grooves 26 having a uniform distance as shown in FIG. 2. Such grooves 26 are referred to as "prism unevenness", which smooths a diffusion of light as well and reduces light loss on a path where light is transmitted toward the upper portion of the light guide 4. This increases the amount of light transmitted toward the liquid crystal display panel. Typically, the prism light guide 4 is made from an acryl such as PMMA, etc., and the grooves 26 are formed in an equal distance to have a pitch width of about 0.07 to 0.08 mm by a machine working.

Figure 3:
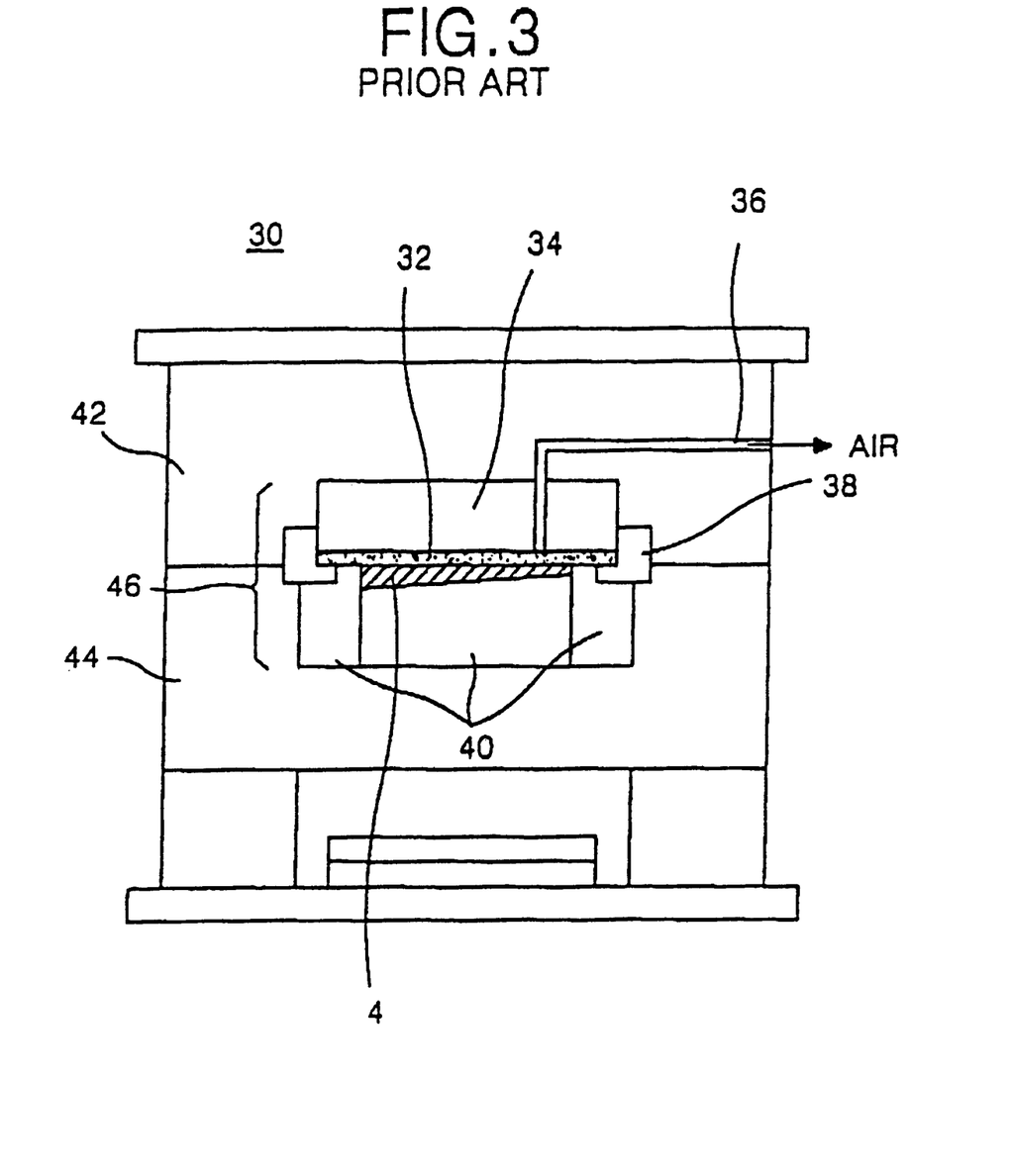
FIG. 3 is a section view showing a structure of a conventional injection-molding device used for fabricating the prism light guide.

The prism light guide 4 having the structure as mentioned above is, for example, fabricated by an injection-molding device 30 as shown in FIG. 3. Referring to FIG. 3, the conventional light guide injection-molding device 30 consists of a stamper 32 for forming groves 26, a stationary core 34 to which the stamper 32 is attached, a vacuum tube 36 and a vacuum device (not shown) for attaching the stamper 32 to the stationary core 34 by a vacuum force, a stamper fixing segment 38 provided at the side portion of the stationary core 34 to determine an attached position of the stamper 32, a movable core 40 defining a mold 46 along with the stationary core 34, and a stationary molding plate 42 and a movable molding plate 44 for fixing the stationary and movable cores 34 and 40 at the exterior thereof. The stationary core 34 has a thickness of about 20 mm while the stamper 32 has a thickness of about 0.1 to 0.4 mm. In the conventional art, a brass plate (which is easy to work by a grinding process) is preferably used to make the stamper 32. Recently, a high-hardness nickel has been used because the relatively soft brass plate wears too easily, which affects mass production operation. However, since nickel is very hard, it is difficult to form the grooves 26 at an equal distance by a grinding process. In order to solve this problem, a nickel stamper 32 has been made by using a brass plate provided with the prism unevenness grooving as a master, then electroplating nickel on the surface of the brass plate provided with the prism unevenness grooving to a desired thickness. In manufacturing the stamper 32 according to the electroplating method, the stamper 32 has a thickness of about 0.1 to 0.4 mm because it is difficult to make a large plating thickness.

Hereinafter, a conventional method of fabricating the prism light guide 4 is described. First, a position of the stamper 32 to be attached to the stationary core 34 is determined by the stamper fixing segment 38. The stamper 32 is then attached to the attached portion of the stationary core 34. The portion of the stamper 32 attached to the stationary core 34 has a plurality of vacuum holes connected the vacuum tube 36. The stamper 32 is attached to the stationary core 34 by a vacuum force provided by evacuating air through the vacuum tube 36. Thereafter, a prism light guide material is injected into a space between the stationary core 40 and the stamper 32 and then injection-molded to be made into the prism light guide 4 having the prism unevenness grooves 26.

The conventional injection-molding device has a structure in which the stamper 32 is separate from the core 34 of the mold 46. The stamper 32 is temporarily attached to the stationary core 34 of the mold 46 by evacuating air through the vacuum holes provided at the attached portion of the stamper 32 to the stationary core 34. Such a stamper fixing method is mainly used for a product that must be changed frequently. In conventional compact disc injection-molding device (as an example of another application), various kinds of discs must be formed so various kinds of stampers must be changed frequently. Thus, the stamper fixing method employing a vacuum system is used in which attachment and detachment of the appropriate stamper is easy. However, the prism light guide 4 in the LCD is mass produced and therefore does not require frequent attachment and detachment of the stamper until a life of the stamper 32 expires. Therefore, the above-mentioned stamper attaching method using a vacuum system is not available. The conventional injection-molding device 30 has a drawback because it requires an additional device for evacuating air and the attached portion of the stamper 32 to the stationary core 34 must be provided with a plurality of vacuum holes, so device 30 has complex structure and facilities. Also, the conventional injection-molding device 30 unstable attachment due to a deterioration of the vacuum force applied to the stamper 32, its manufacturing becomes unstable. Furthermore, it is inconvenient because cleaning and fine surface grinding work, etc. on the attached portion of the stationary core 34 to the stamper 32 are required to provide an easy air evacuation and strengthen the vacuum force.

SUMMARY OF THE INVENTION

Accordingly, the present invention provides an apparatus for manufacturing a light guide in a liquid crystal display and a manufacturing method thereof wherein a mold structure is simplified.

The present invention also provides an apparatus for manufacturing a light guide in a liquid crystal display and a manufacturing method thereof that are adapted to make a stable light guide molding work.

Therefore, a light guide fabricating apparatus according to one aspect of the present invention includes a stamper for molding a light guide; a core material portion with a desired thickness fixed to the stamper, to constitute an integral molding core; and a fixing member or structure for fixing the stamper to the core material portion, said integral-type molding device defining a mold for molding the light guide along with the stationary core and the movable core.

A method of manufacturing a light guide fabricating apparatus according to another aspect of the present invention includes fixing a light guide molding stamper to a core material portion having a desired thickness to form an integral mold core; and fixing the integral mold core to the stationary core and the movable core to define a mold.

BRIEF DESCRIPTION OF THE DRAWINGS

These and other aspects of the present invention will be apparent from the following detailed description of the embodiments of the present invention with reference to the accompanying drawings, in which.

DETAILED DESCRIPTION OF THE PREFERRED EMBODIMENT

Figure 4:
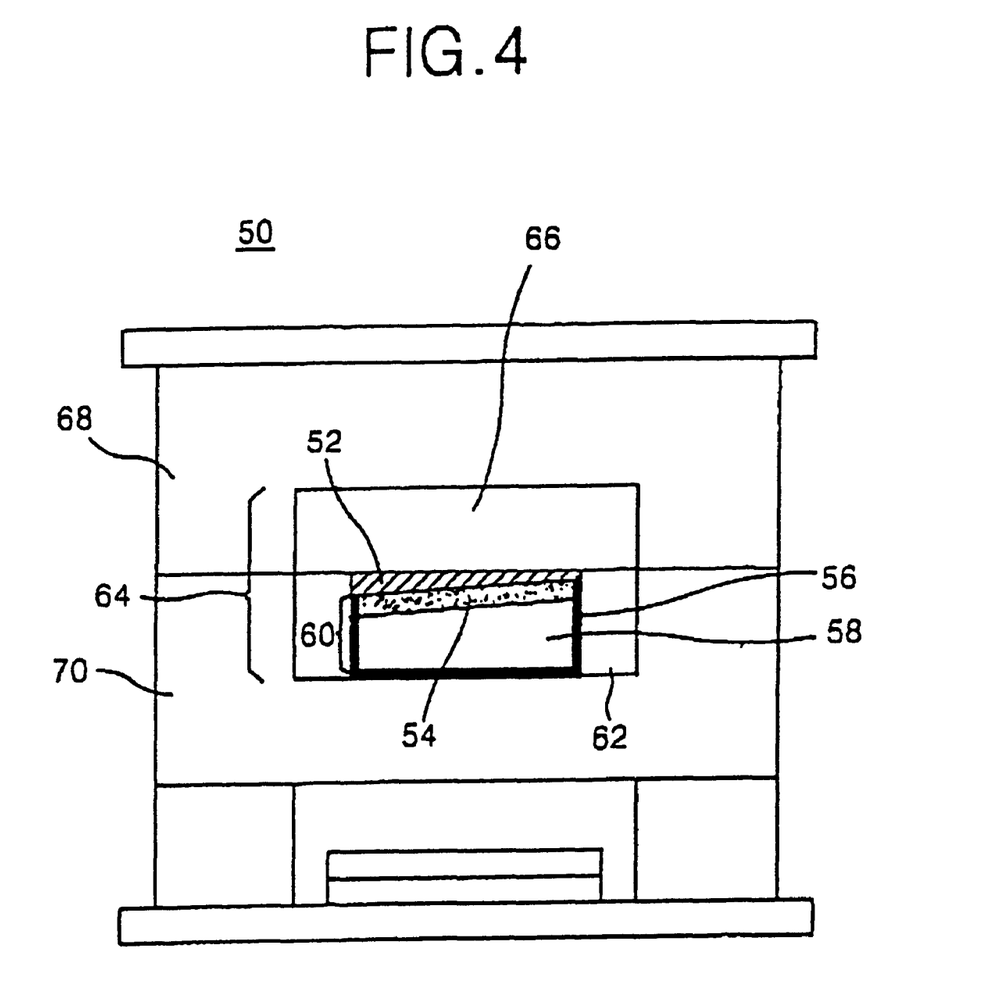
FIG. 4 is a section view showing a structure of a light guide fabricating apparatus according to a first embodiment of the present invention.

Referring to FIG. 4, a light guide fabricating apparatus according to a first embodiment of the present invention is shown. In the conventional light guide injection-molding device, a stamper for injection-molding the prism light guide is separate from a core. However, in a light guide injection-molding device according to the first embodiment of the present invention, the stamper is engaged to a core material portion having a desired thickness to be made into an integral mold. In order to form prism unevenness grooves having the same shape at the lower surface of a prism light guide 52, the injection-molding device 50 includes a stamper 54 provided with prism unevenness grooves at a surface contacting an injected light guide material, a core material portion 58 to which the stamper 54 is attached by virtue of a nickel electroplate structure 56 on the surfaces of the stamper 54 and the core material portion 58, a movable core 62 for fixing an integral molding device 60 in which the stamper 54 and the core inside material 58 are fixedly joined by nickel electroplating 56, a stationary core 66 of a mold 64 provided along with the integral molding device 60 and the movable core 62, and a stationary molding plate 68 and a movable molding plate 70 for fixing the stationary core 66 and the movable core 62, respectively. The stamper 54 is formed about 0.3 to 0.4 mm thick by electroplating nickel on the surface of a brass plate master provided with prism unevenness grooves. The core material portion 58 to which the stamper 54 is attached uses the same metal (e.g., nickel) as the stamper 54 or a different metal (e.g., Prehardening steel) from the stamper 54, and has a thickness of about 20 to 30 mm.

The prism light guide 52 is manufactured by injecting a substance such as acryl, etc. into a space between the integral molding device 60 fixed with the stamper 54 and the stationary core 66 under pressure. The light guide fabricating apparatus according to the present invention does not require additional complex facilities such as the conventional vacuum device, etc. because the stamper 54 and the core inside material 58 are mutually bonded to each other by virtue of the nickel electroplate 56 on the surface thereof. Accordingly, it is possible to provide a simplified mold structure as well as more stable manufacturing of the prism light guide 52 because the stamper 54 is always kept attached to the inside material portion 58.

Figure 5A:
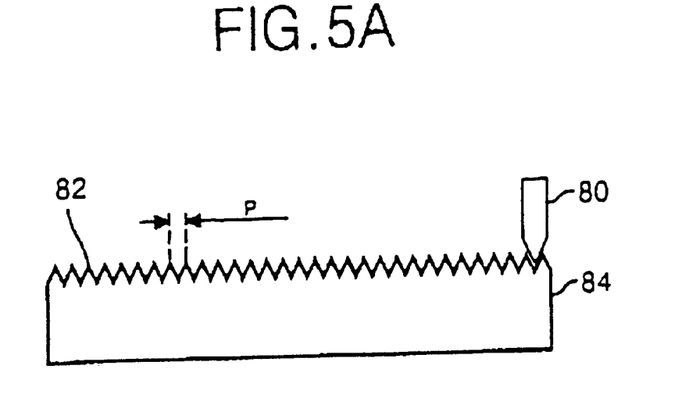
FIG. 5A to FIG. 5E are section views for explaining a method of manufacturing a stamper-integrated mold core according to a first embodiment of the present invention.
Figure 5B:
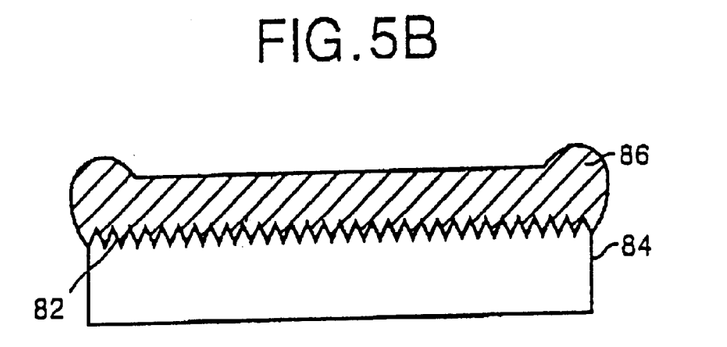
Figure 5C:
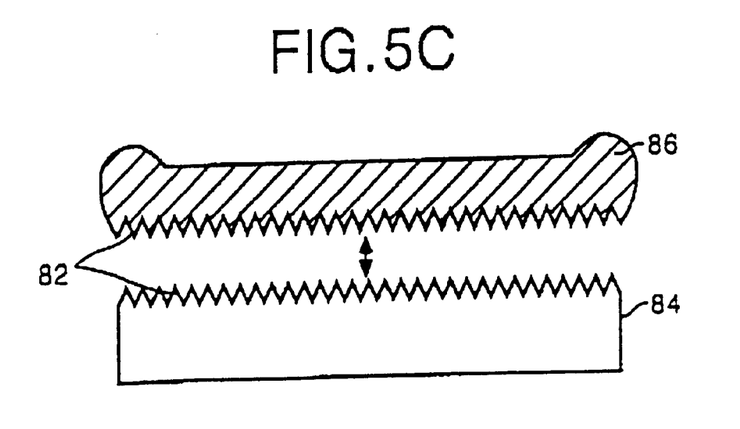
Figure 5D:
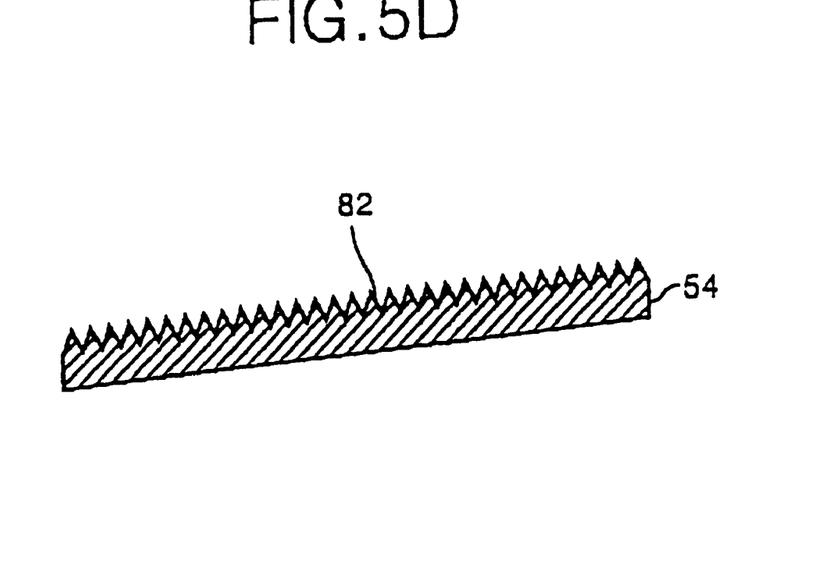
Figure 5E:
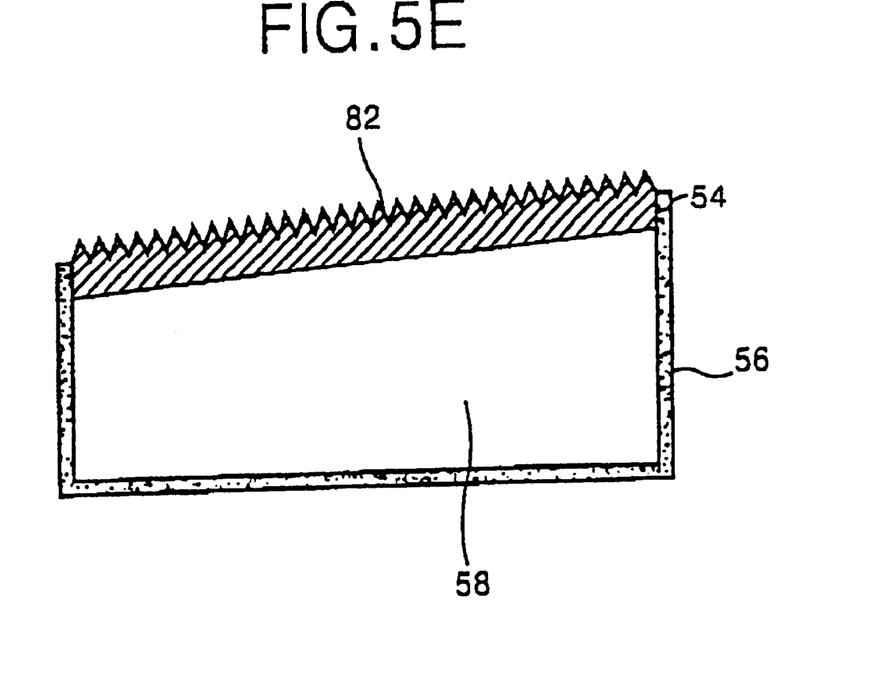

In a first embodiment of the present invention, a method of manufacturing the molding device 60 will be described with reference to FIGS. 5A to FIG. 5E. First, as shown in FIG. 5A, prism unevenness grooves 82 are formed on the surface of a brass plate by a grinding process employing, for example, a bit 80 to prepare a master 84. By a mechanical machining using the bit 80, a pitch width P of the prism unevenness grooves 82 are formed at equal distances on the surface of the master 84, from 0.07 to 0.08 mm. Next, as shown in FIG. 5B, the surface of the master 84 provided with the prism unevenness grooves 82 is electroplated with nickel to form a nickel electrotype 86. Subsequently, as shown in FIG. 5C, the nickel electrotype 86 is separated from the master 84 to provide a nickel electrotype 86 having the prism unevenness grooves 82. Then, the rear and side surfaces of the electrotype 86 are machined to complete the nickel stamper 54. In this case, the stamper 54 has a thickness of about 0.3 to 0.4 mm. Finally, the manufactured stamper 54 is put on the core material portion 58 with a thickness of 20 to 30 mm to perform an electrotyping work for fixing the stamper 54 and the core material portion 58. In other words, as shown in FIG. 5E, the surfaces of the stamper 54 and the core inside material portion 58 are electroplated with nickel to form a nickel sealing electroplate 56. The core material portion 58 may be made from the same metal material (e.g., nickel) as the stamper 54 or a different metal material (e.g., Prehardening steel). Consequently, the integral-type molding device 69 in which the stamper 54 and the core material portion 58 are sealed together by the nickel electroplate 56 is completed.

Figure 6:
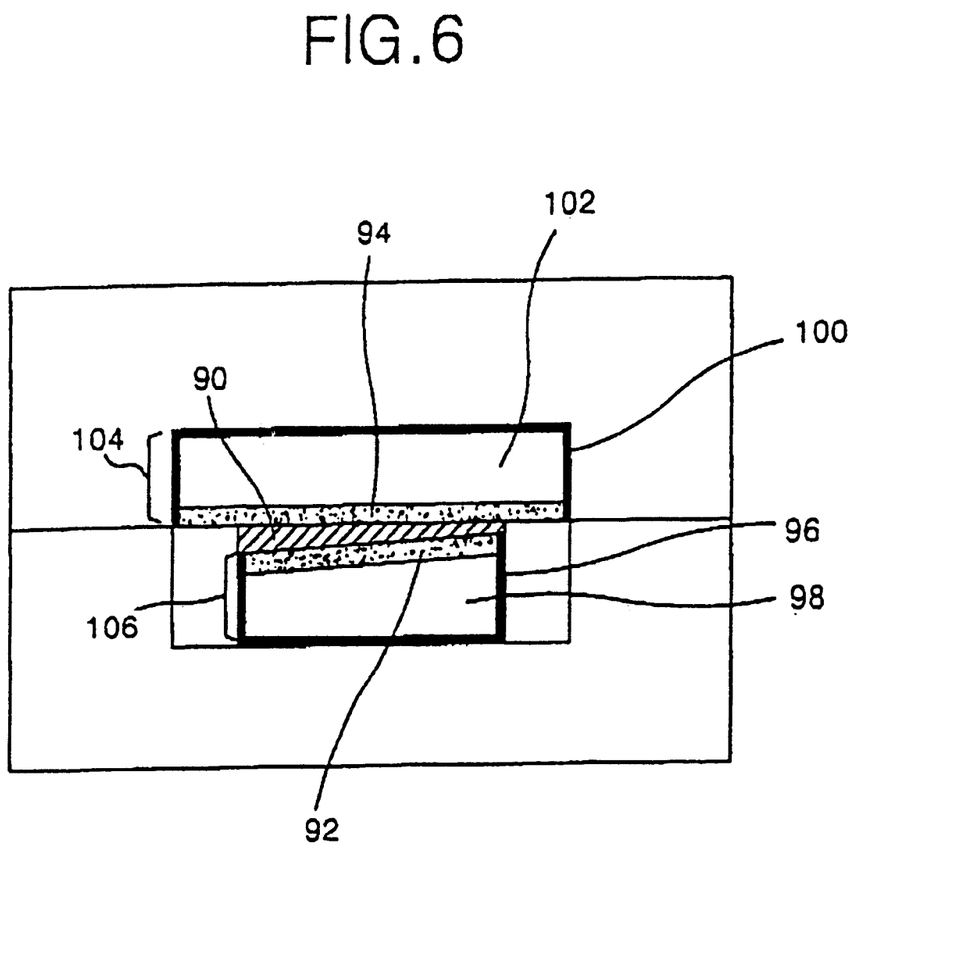
FIG. 6 is a section view showing a structure of a light guide fabricating an apparatus for molding double-faced prism unevenness grooving having an integral mold structure according to the first embodiment of the present invention.

Such a molding device also is applicable to a molding device for forming unevenness grooves at both sides of the prism light guide. In this case, groove-forming stampers 92 and 94 are provided at the upper and lower portions of the injection-molded prism light guide 90, respectively, as shown in FIG. 6. The stamper 92 for forming prism unevenness grooves on the lower surface of the prism light guide 90 is fixed to a core material portion 98 at the lower portion thereof by a nickel electroplate 96 similar to that in FIG. 4, to make molding device 106. On the other hand, the upper stamper 94 for forming the prism unevenness grooves on the upper surface of the prism light guide 90 is fixed to an upper core material portion 102 by an upper nickel electroplate 100 to make an upper molding device 104. A general core metal such as Prehardening steel is used as the lower and upper core material portions 98 and 102. Since complex features such as an additional vacuum device for fixing the stampers are not required, the mold structure can be simplified. Also, because the lower stamper 92 or the upper stamper 94 is always fixed to the core material portions 98 and 102 by the nickel electroplates 96 and 100, a stable injection-molding work can be made.

Figure 7:
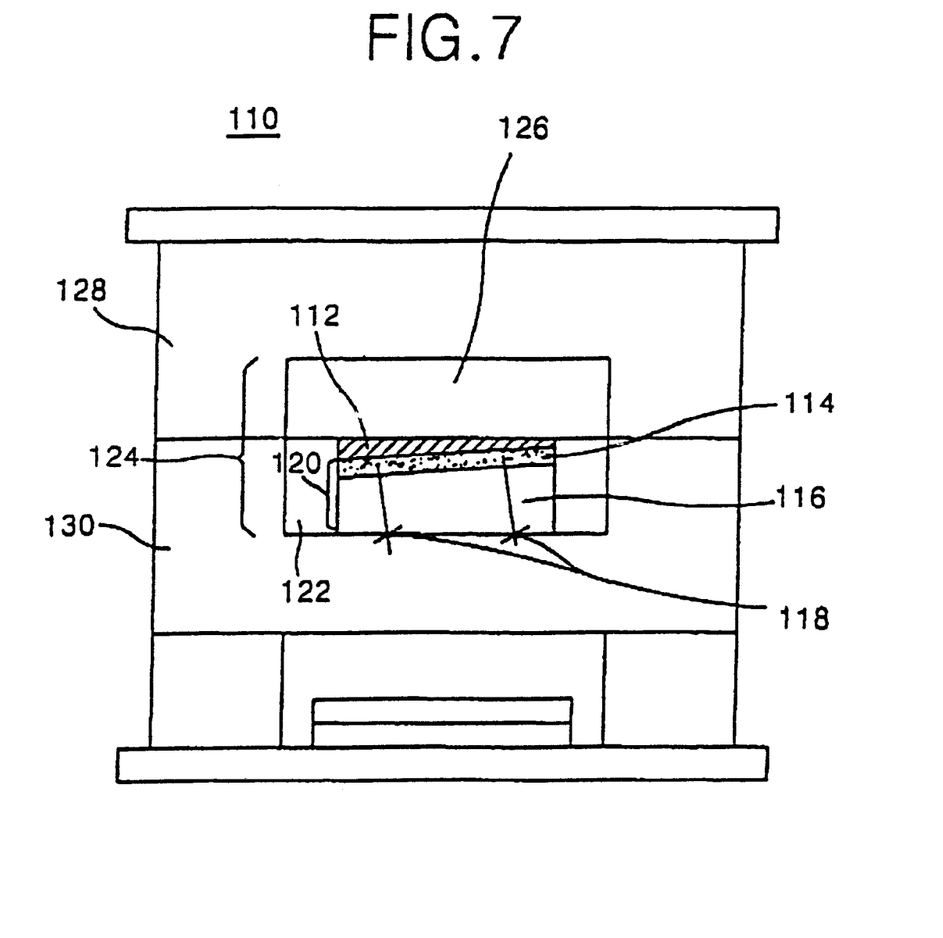
FIG. 7 is a section view showing a structure of a light guide fabricating apparatus according to a second embodiment of the present invention.

Referring to FIG. 7, a light guide fabricating apparatus according to a second embodiment of the present invention is shown. In a light guide injection-molding device according to the second embodiment of the present invention, a stamper is engaged with a core by bolt members to provide a mold. In order to form prism unevenness grooves on the lower surface of prism light guide 112, the light guide injection-molding device 110 includes a stamper 114 provided with prism unevenness grooves on a surface contacting an injected light guide material, a molding core 116 to which the stamper 114 is attached, one or more bolts 118 for engaging the stamper 114 with the molding core 116, a stationary core 126 constituting a mold 124 along with the integral-type molding device 120 made by engaging the stamper 114 and the molding core 116, and a movable core 122, and a stationary molding plate 128 and a movable molding plate 130 for fixing the stationary core 126 and the movable core 122 at the exterior thereof, respectively. The stamper 114 is manufactured by the nickel electroplating system using a brass plate master like the first embodiment. In the second embodiment, however, since bolt holes are formed in the stamper 114 to engage the stamper 114 and the molding core with bolts, the plated electrotype must have a middle thickness of about 6 to 12 mm. For the sake of bolt-engaging, the stamper 114 is put on the molding core 116 and a plurality of bolt-engaging holes are formed from the lower portion of the molding core 116 to a desired depth of the stamper 114 by a grinding process. Bolts 118 are then inserted into the holes to fix the stamper 114 to the molding core 116. By this method, the mold structure can not only be simplified, but also the stamper 114 can also be stably fixed to the molding core 116. The stamper-integrated mold structure employing the bolt-engagement system is also applicable to a double-faced unevenness-molding device for transcription-molding both sides of the prism light guide. In this case, the upper and lower stampers are fixed to the stationary and movable cores, respectively, by bolts to be integrally formed.

As described above according to the present invention, a light guide molding stamper is fixed to an core material portion by nickel electroplate or by bolt members and the like. Such a fixing method is advantageous because it is useful for mass production of a mold structure with a considerably simplified structure. In addition, fixing the stamper to the core material portion of the core as well as stable product manufacturing can be obtained.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A portion of a mold apparatus for manufacturing a light guide comprising:

a stamper configured to define a surface of a light guide; and a core material portion fixed to said stamper by a fixing structure, wherein said fixing structure is an electroplate material plated on said stamper and said core material portion so as to join said stamper and said core material portion.

2. The portion of a mold apparatus according to claim 1, wherein said stamper is at least partly made from nickel.

3. The portion of a mold apparatus according to claim 2, wherein said electroplate is at least partly made from nickel.

4. The portion of a mold apparatus according to claim 1, wherein said stamper and said electroplate are both made from nickel.

5. The portion of a mold apparatus according to claim 1, wherein said core material portion is made from metal.

6. The portion of a mold apparatus according to claim 5, wherein said core material portion is made from one of nickel and prehardening steel.

7. The portion of a mold apparatus according to claim 1, wherein said stamper is between 0.3 and 0.4 mm thick.

8. The portion of a mold apparatus according to claim 1, wherein said core material portion is between 20 and 30 mm thick.

9. The portion of a mold apparatus according to claim 7, wherein said core material portion is between 20 and 30 mm thick.

10. The portion of a mold apparatus according to claim 1, wherein said stamper is configured to define prism uneveness grooves in a surface of a light guide.

11. A method of manufacturing a light guide, comprising:

defining a molding chamber, including defining at least one surface of the molding chamber with a stamper configured to define a surface of a light guide, wherein the stamper is fixedly mounted on a core material portion with a fixing structure that is an electroplate material plated on said stamper and said core material portion so as to join said stamper and said core material portion; and molding a molding material in the molding chamber to form a light guide having a surface thereof defined by the stamper.

12. The method according to claim 11, wherein defining a molding chamber comprises:

forming a stamper electrotype by plating a metallic material on a brass plate master to obtain a stamper electrotype; and mounting the stamper electrotype on the core material portion and fixing the stamper to the core material portion to obtain a stamper.

13. The method according to claim 12, wherein the metallic material is nickel.

14. The method according to claim 12, wherein mounting the stamper electrotype on the core material portion comprises plating an electroplate material over the stamper electrotype and the core material portion to fix the stamper electrotype relative to the core material portion.

15. The method according to claim 12, comprising:

forming prism unevenness grooves in the brass plate master;

plating a metallic material on the brass plate master having the prism unevenness grooves formed therein thereby forming an stamper electrotype;

separating the stamper electrotype from the brass plate master such that prism unevenness grooves are formed in the stamper electrotype; and shaping the stamper electrotype having the prism unevenness grooves formed therein.

16. The method according to claim 12, wherein the metallic material and the core material portion are both nickel.

17. The method according to claim 11, wherein the core material portion is one of nickel and prehardening steel.

18. The method according to claim 11, wherein the stamper has a thickness between 0.3 and 0.4 mm.

19. The method according to claim 11, wherein the core material portion is between 20 and 30 mm thick.

* * * * *